(12) United States Patent
Gibbs et al.

(10) Patent No.: US 11,477,296 B2
(45) Date of Patent: Oct. 18, 2022

(54) DYNAMIC USER GROUP MANAGEMENT IN GROUP-BASED COMMUNICATION SYSTEMS

(71) Applicant: Slack Technologies, Inc., San Francisco, CA (US)

(72) Inventors: Colin Gibbs, San Francisco, CA (US); Daniel Fornal, San Francisco, CA (US); Matthew Kump, Vancouver (CA); Scott Schiller, Vancouver (CA); Cole Johnson, San Francisco, CA (US); Danielle Kefford, San Francisco, CA (US); Ed Donghyun Kim, San Carlos, CA (US); Eduardo Javier Castillo Urdaneta, San Francisco, CA (US); Jyri Tuulos, Oakland, CA (US); Leo Thumma, Dublin, CA (US); Sameera Thangudu, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 16/778,321

(22) Filed: Jan. 31, 2020

(65) Prior Publication Data
US 2021/0243269 A1 Aug. 5, 2021

(51) Int. Cl.
*H04L 29/08* (2006.01)
*H04L 67/306* (2022.01)
*H04L 12/18* (2006.01)
*H04L 41/22* (2022.01)

(52) U.S. Cl.
CPC .......... *H04L 67/306* (2013.01); *H04L 12/185* (2013.01); *H04L 41/22* (2013.01)

(58) Field of Classification Search
CPC ...................................................... H04L 67/306
See application file for complete search history.

(56) References Cited

U.S. PATENT DOCUMENTS

| | | | |
|---|---|---|---|
| 8,108,494 B1 * | 1/2012 | Holland | H04L 67/22 709/220 |
| 8,214,747 B1 * | 7/2012 | Yankovich | G06F 9/4451 715/751 |
| 2013/0080242 A1 * | 3/2013 | Alhadeff | G06Q 30/0239 705/14.39 |
| 2018/0287982 A1 * | 10/2018 | Draeger | H04L 51/16 |

OTHER PUBLICATIONS

"Die, Email, Die! A Flickr Cofounder Aims to Cut Us All Some Slack", Readwriteweb, Lexisnexis, https://advancelexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Adnan M Mirza
(74) *Attorney, Agent, or Firm* — Lee & Hayes, P.C.

(57) ABSTRACT

Embodiments of the present disclosure provide methods, systems, apparatuses, and computer program products that enable performing dynamic user group management in a group-based communication system.

20 Claims, 11 Drawing Sheets

(56) References Cited

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 17 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", FUJITSU Sci. Tech. J., 36, 2, (Dec. 2000) 154-161.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advancelexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", FORBES, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

DYNAMIC USER GROUP MANAGEMENT IN GROUP-BASED COMMUNICATION SYSTEMS

BACKGROUND

Effective and efficient user profile data processing is important to reliability and efficiency of various largescale software applications. Applicant has identified a number of deficiencies and problems associated with user profile data processing in various existing largescale software applications. Through applied effort, ingenuity, and innovation, many of these identified problems have been solved by developing solutions that are included in embodiments of the present disclosure, many examples of which are described in detail herein.

BRIEF SUMMARY

Embodiments disclosed herein are directed to performing dynamic user group management in a group-based communication system. The group-based communication system may include a group-based communication server, a group-based communication repository, a plurality of group-based communication workspaces, and/or a plurality of group-based communication channels.

According to some aspects of the present disclosure, an apparatus for performing dynamic user group management in a group-based communication system is disclosed. The disclosed apparatus comprises at least one processor and at least one memory including computer program code. The memory and the computer program code are configured to, with the processor, cause the apparatus to receive dynamic user group configuration data associated with a dynamic user group, wherein the dynamic user group configuration data comprise interface association data associated with the dynamic user group, and wherein the interface association data define a related group-based communication interface of a plurality of group-based communication interfaces of the group-based communication system that is associated with the dynamic user group, and wherein the related group-based communication interface is associated with a related administrator user profile; and generate one or more interface configuration user interfaces configured to enable the related administrator user profile for the related group-based communication interface to define one or more group visibility parameters for the dynamic user group with respect to the related group-based communication interface and to enable the related administrator user profile for the related group-based communication interface to generate group membership modification requests for the dynamic user group.

BRIEF DESCRIPTION OF THE DRAWINGS

Figure 1:
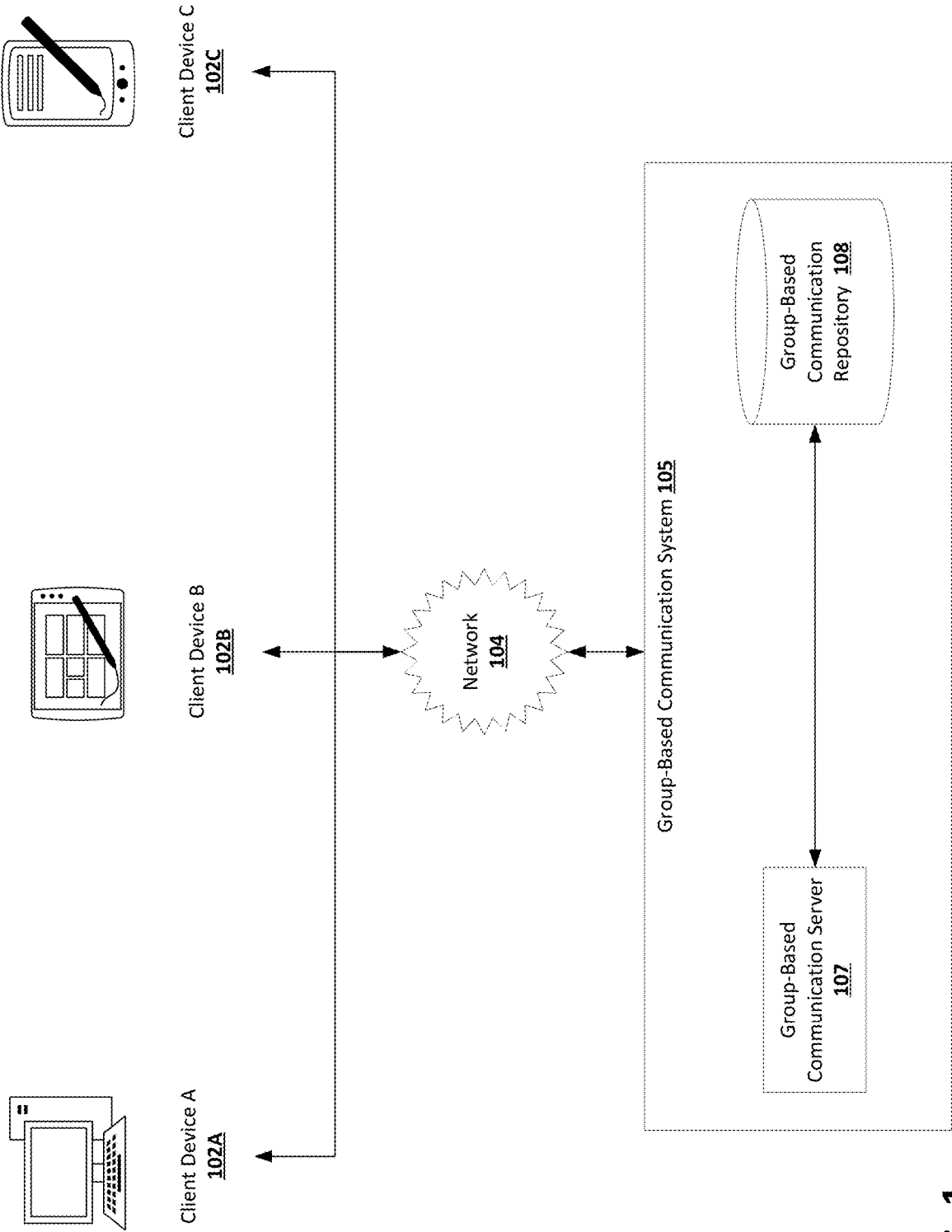

Having thus described the disclosure in general terms, reference will now be made to the accompanying drawings, which are not necessarily drawn to scale, and wherein:

FIG. 1 depicts an example architecture for implementing some embodiments of the present disclosure.

Figure 2:
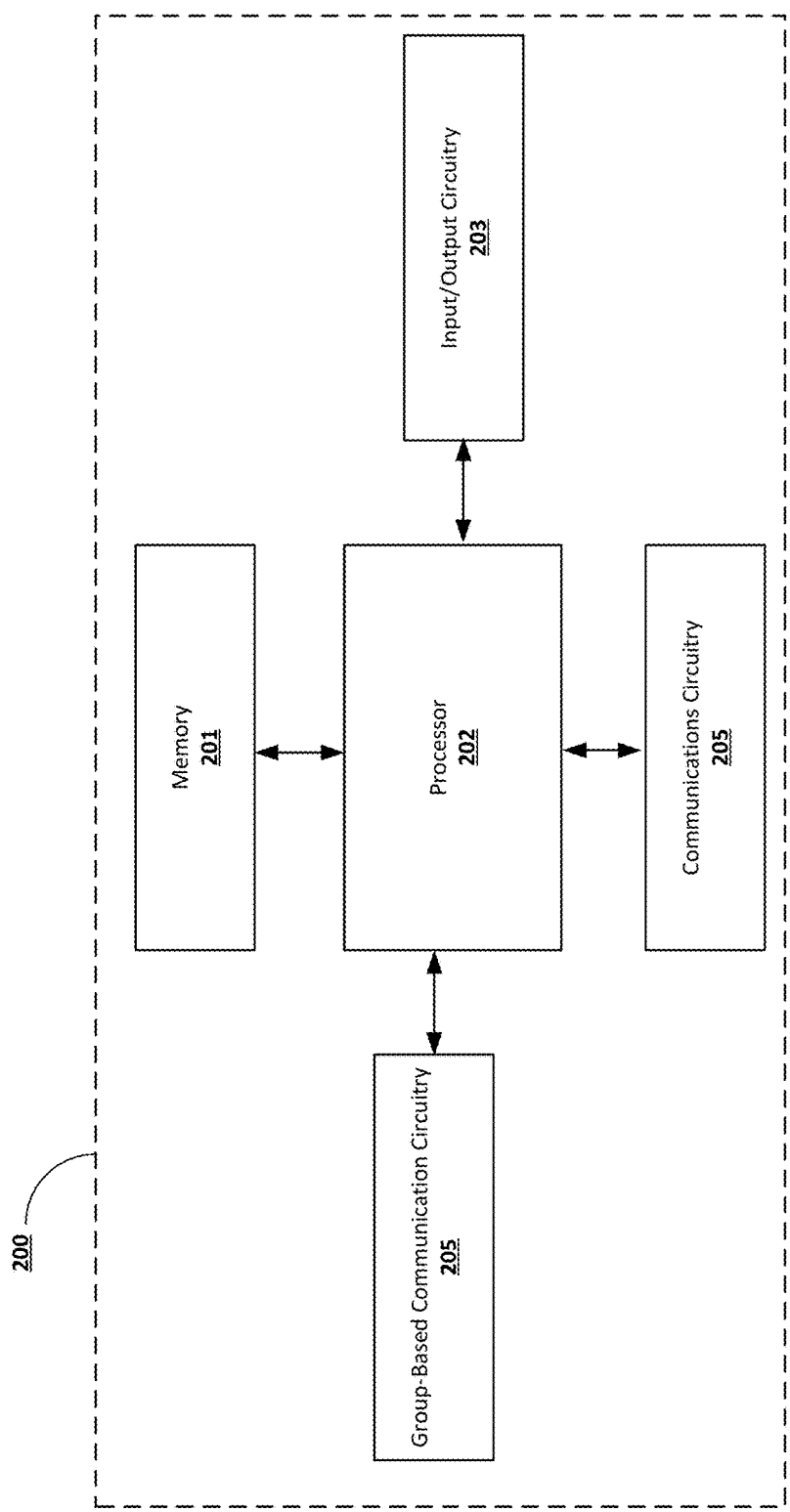

FIG. 2 depicts an exemplary apparatus for a group-based communication server according to some embodiments of the present disclosure.

Figure 3:
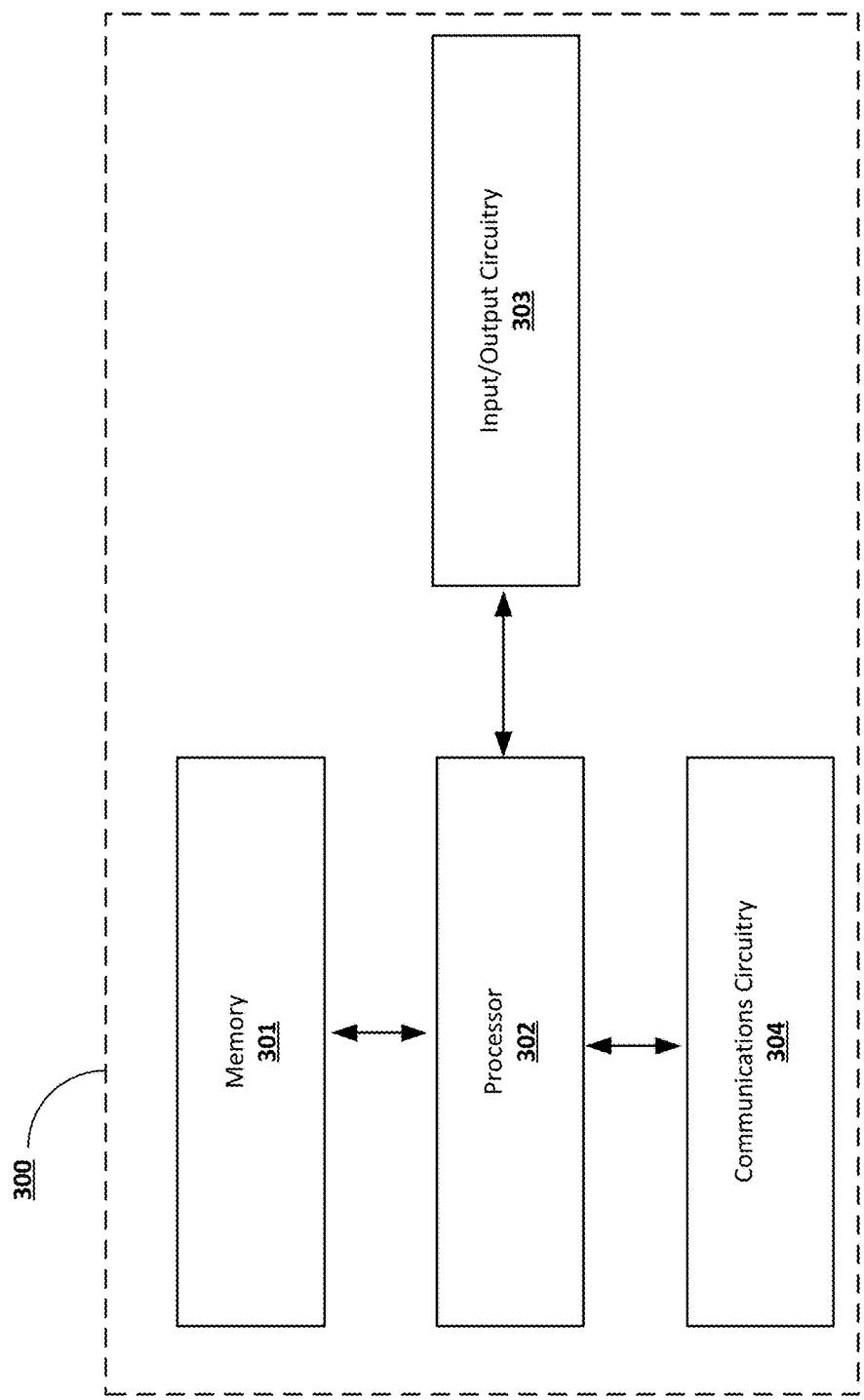

FIG. 3 depicts an exemplary apparatus for a client computing device according to some embodiments of the present disclosure.

Figure 4:
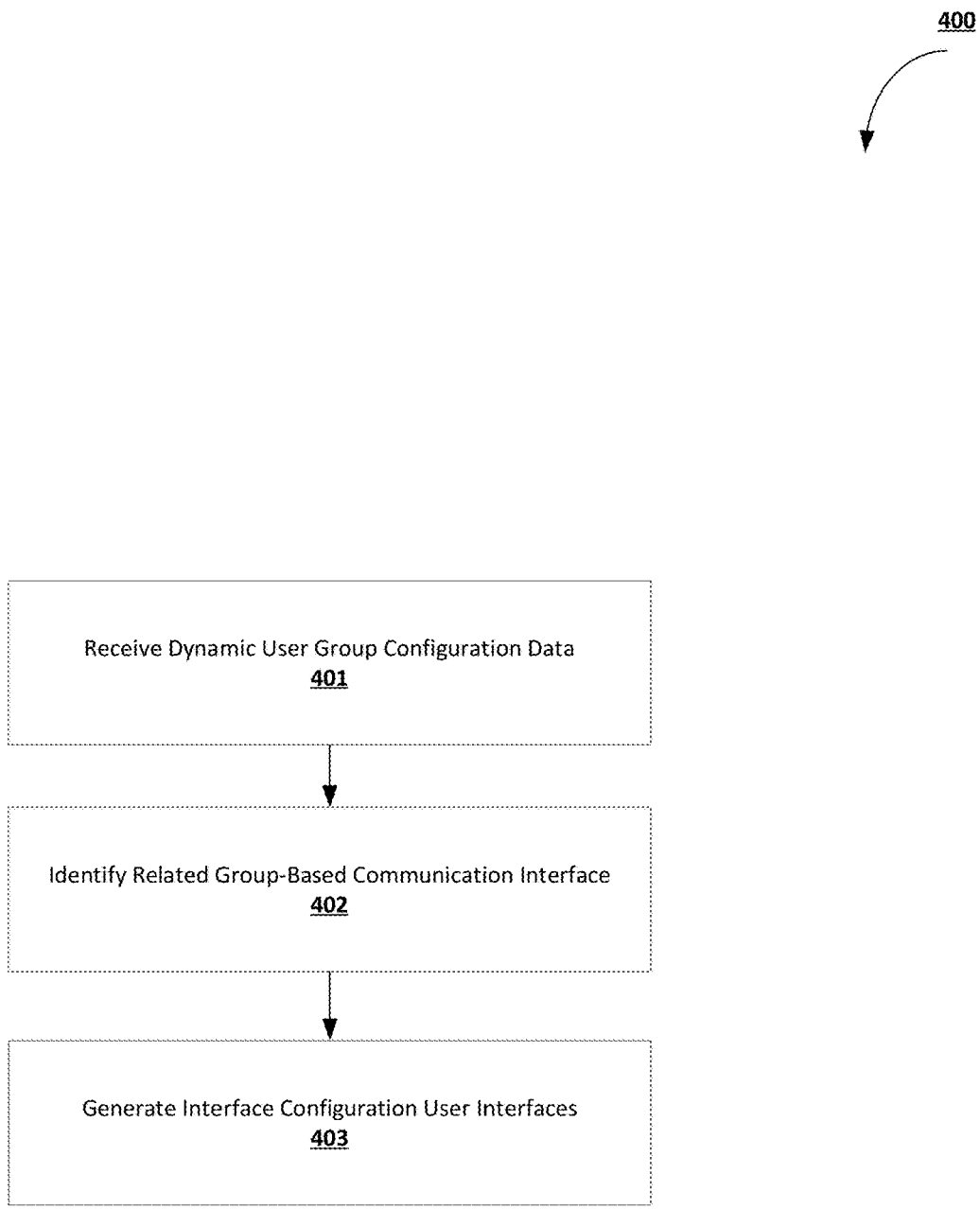

FIG. 4 is a flowchart diagram of an example process for performing dynamic user group management in a group-based communication system according to some embodiments of the present disclosure.

Figure 5:
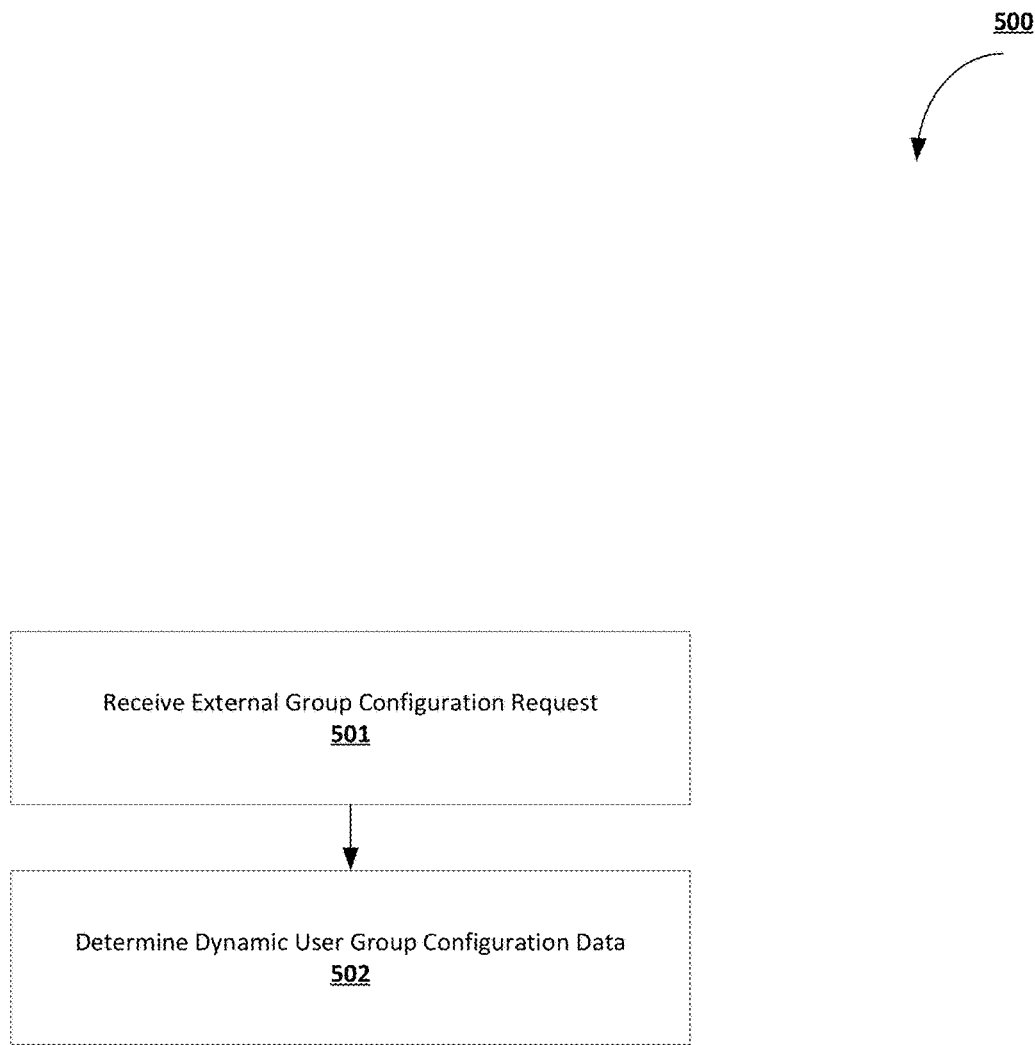

FIG. 5 is a flowchart diagram of an example process for determining dynamic user group configuration data based on external group configuration requests according to some embodiments of the present disclosure.

Figure 6:
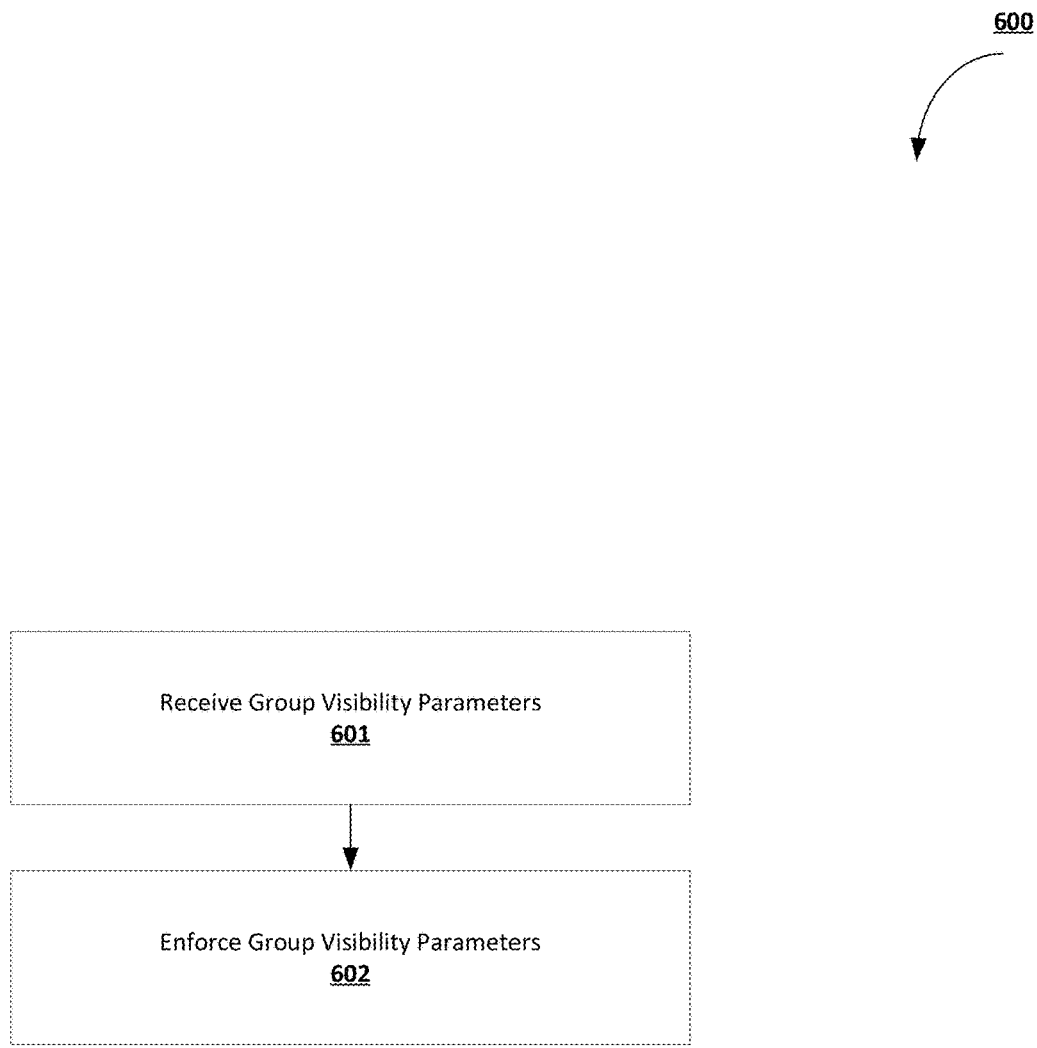

FIG. 6 is a flowchart diagram of an example process for enforcing group visibility parameters for a dynamic user group in relation to a group-based communication channel according to some embodiments of the present disclosure.

Figure 7:
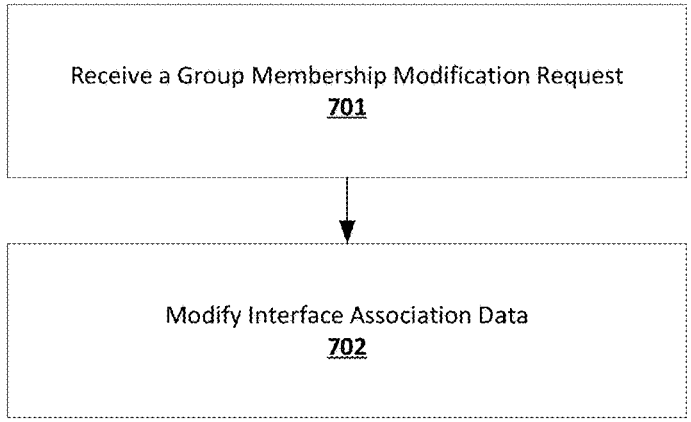

FIG. 7 is a flowchart diagram of an example process for enforcing a group membership modification request for a dynamic user group in relation to a group-based communication channel according to some embodiments of the present disclosure.

Figure 8:

FIG. 8 provides an operational example of an external group configuration interface according to some embodiments of the present disclosure.

Figure 9:
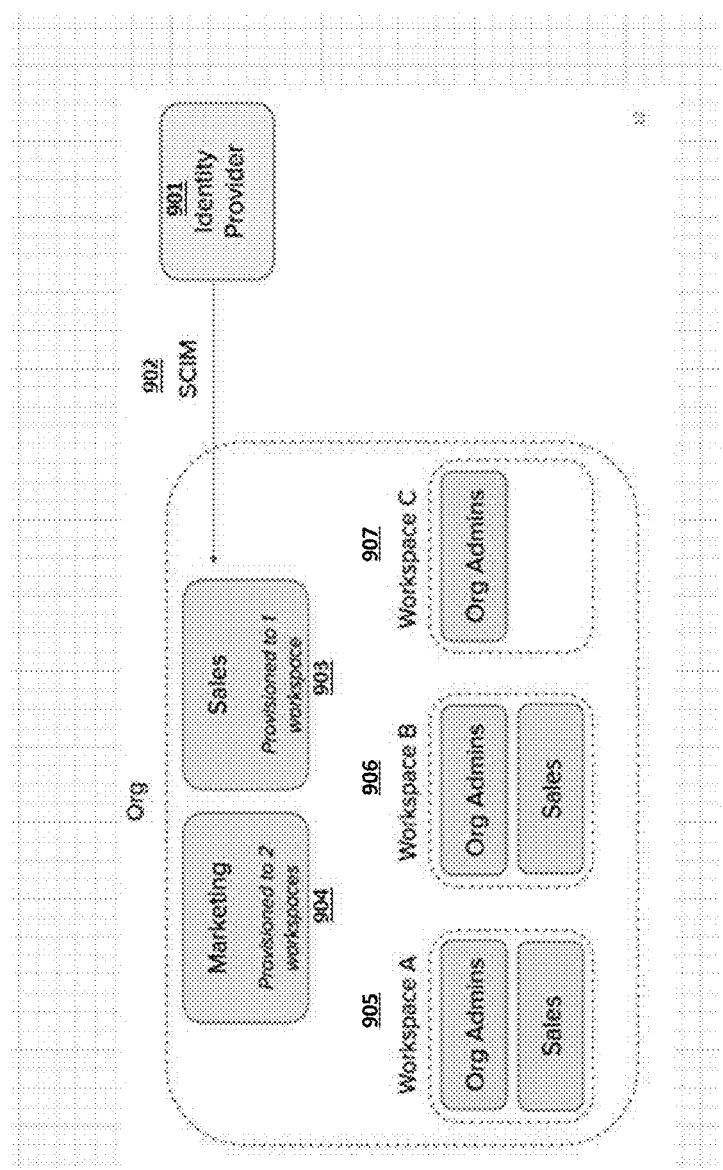

FIG. 9 provides an operational example of a software architecture that enables dynamically associating user groups with group-based communication interfaces according to some embodiments of the present disclosure.

Figure 10:
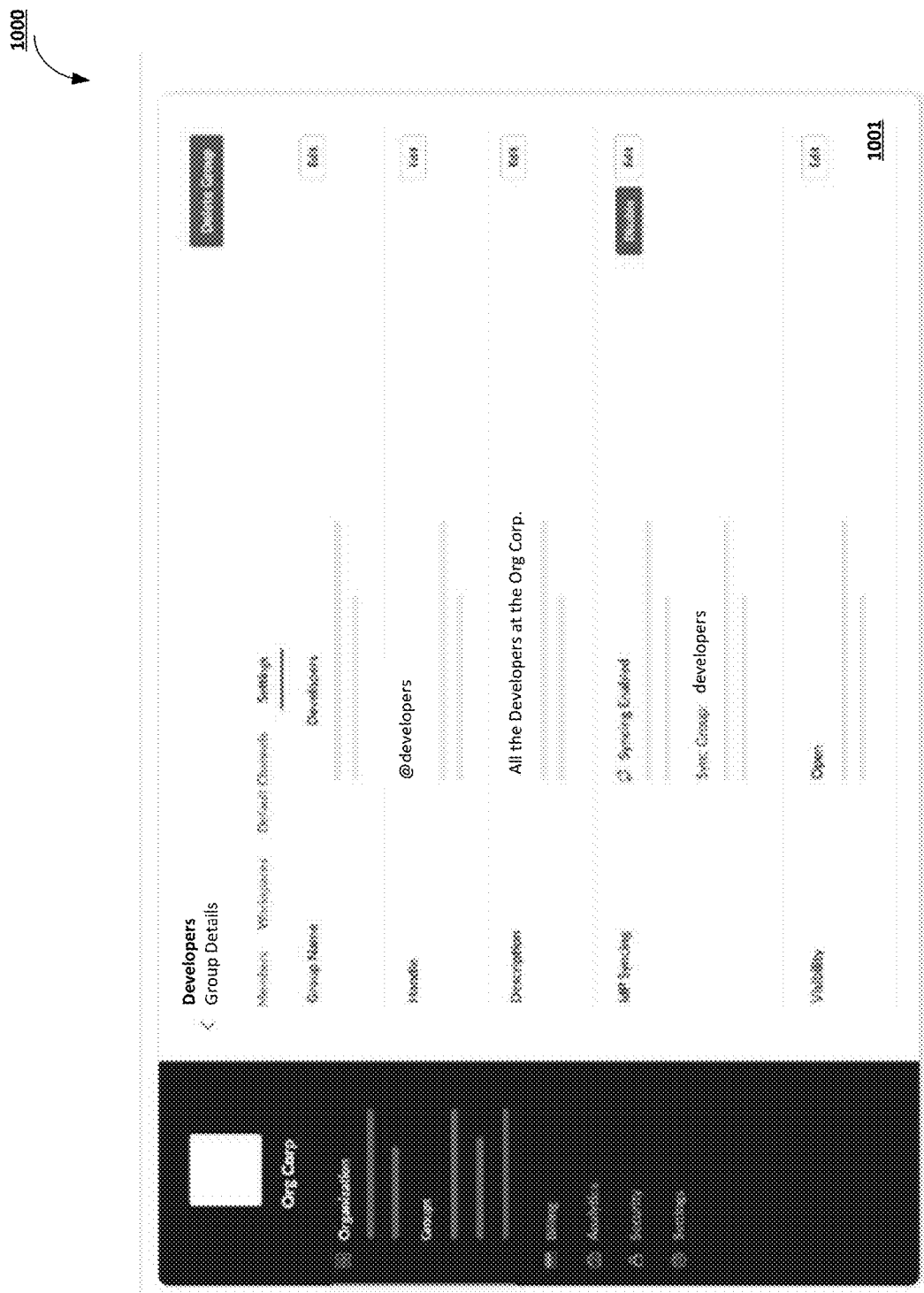

FIG. 10 provides an operational example of a general interface configuration user interface according to some embodiments of the present disclosure.

Figure 11:
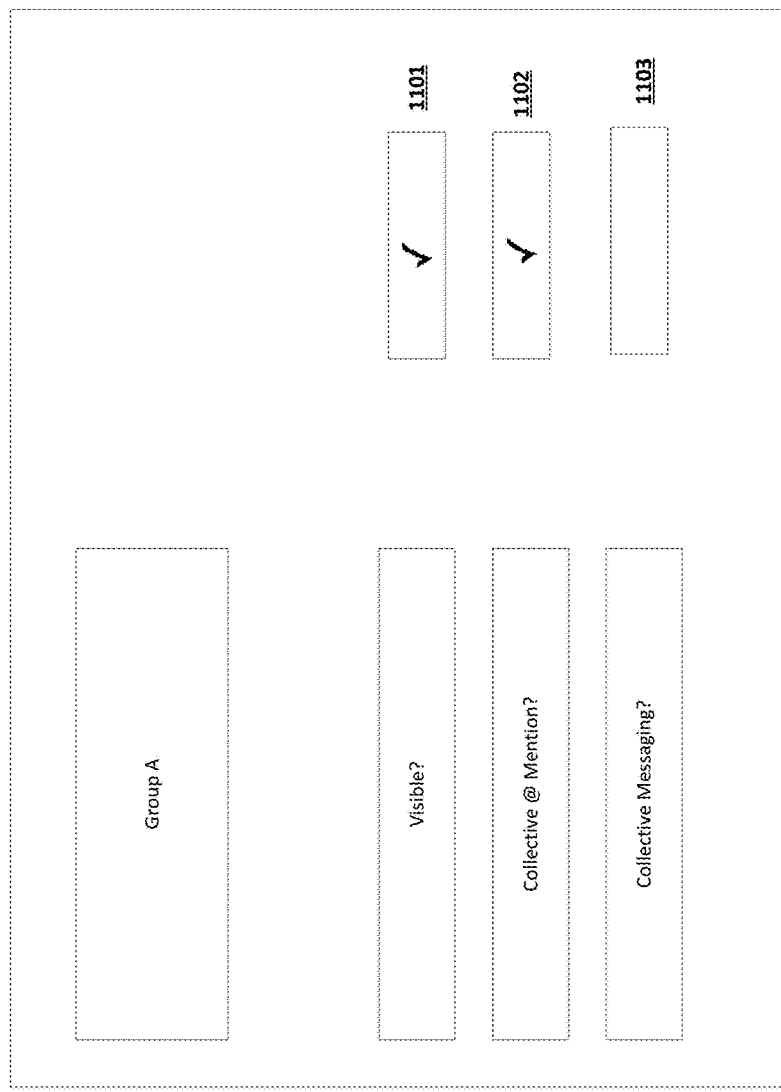

FIG. 11 provides an operational example of a visibility-defining interface configuration user interface according to some embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," "payload object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client computing device" refers to computer hardware and/or software that is configured to access a service made available by a server. The server is often (but not always) on another computer system, in which case the client computing device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client computing devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client computing devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "profile," "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client computing device and that is configured for display within a group-based communication channel. Message communications may include any text, image, video, audio or combination thereof provided by a user (using a client computing device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

The term "group-based communication interface" or "group-based communication workspace" refers to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.).

In some embodiments, a group-based communication interface is associated with a group of users and a set of group-based communication objects all of which are associated with a common group identifier. Thus, users sharing a group identifier also share group-based communication objects. In other words, users sharing a common group identifier that is also shared by a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

The term "group-based user profile" refers to a data object that uniquely identifies a corresponding user of a group-based communication system and enables the corresponding user to access designated contents and/or functionalities of the group-based communication system. A group-based user profile may enable a corresponding user to login to the group-based communication system and interact with various software and hardware functionalities provided by the group-based communication system. The group-based communication system may enable a user to have access to particular digital information in accordance with user authorization information defined in part based on the group-based user profile of the user. For example, the group-based communication system may associate the group-based user profile with one or more group-based communication interfaces and accordingly grant the group-based system user-profile access to contents of the one or more group-based communication interfaces.

The term "dynamic user group" refers to a data object that describes a list of user profiles that can be collectively assigned to particular group-based communication interfaces within a group-based communication system, where the list of user profiles can be modified after creation of the dynamic user group by adding new user profiles and/or by removing existing user profiles. In some embodiments, user profiles associated with a dynamic user group can collectively be assigned particular intra-interface group functionalities and/or particular intra-interface group visibility parameters.

The term "dynamic user group configuration data" refers to a data object that describes one or more collective actions to be performed with respect to a corresponding dynamic user group. For example, dynamic user group configuration data for a particular dynamic user group may define one or more related group-based communication interfaces associated with the particular dynamic user group. As another example, dynamic user group configuration data for a particular dynamic user group may define intra-interface group visibility parameters for a particular dynamic user group within a particular related group-based communication interface associated with the particular dynamic user group. As yet another example, dynamic user group configuration data for a particular dynamic user group may define intra-interface group functionalities for a particular dynamic user group within a particular related group-based communication interface associated with the particular dynamic user group.

The term "interface association data" refers to a portion of dynamic user group configuration data associated with a corresponding dynamic user group that defines one or more related group-based communication interfaces for the dynamic user group. In some embodiments, the interface association data comprises a list of related group-based communication interfaces, e.g., a list of related group-based communication interfaces that may be dynamically modified by adding new related group-based communication interfaces and/or by removing existing related group-based communication interfaces.

The term "related group-based communication interface" refers to a group-based communication interface that is assigned to a corresponding dynamic user group, where assigning of the related group-based communication interface to the corresponding dynamic user group causes each group-based user profile in the dynamic user group to be associated with the dynamic user group during the period in which the relationship between the related group-based communication interface and the dynamic user group is in effect. In some embodiments, removal of the relationship between the related group-based communication interface and the dynamic user group causes all other group-based user profiles associated with the dynamic user group to be removed from the related group-based communication interface. In some embodiments, a relationship between a related group-based communication interface and a dynamic user group is determined based on instructions generated by a related administrator user profile associated with the related group-based communication interface. In some embodiments, a relationship between a related group-based communication interface and a dynamic user group is determined based on instructions generated by a group administrator user profile associated with the dynamic user group.

The term "related administrator user profile" refers to a user profile that controls association of group-based user profiles with a corresponding group-based communication interface as well as at least one aspect of the scope of activities of the group-based user profiles associated with corresponding group-based communication interface. In some embodiments, the related administrator user profile for a corresponding related group-based communication interface defines, for each dynamic user group associated with the corresponding related group-based communication interface, association of the dynamic user group with the corresponding related group-based communication interface as well as group visibility parameters for the dynamic user group in relation to the corresponding related group-based communication interface.

The term "interface configuration user interface" refers to a data object that describes a user interface configured to receive instructions by a related administrator user profile, where the instructions are configured to control association of group-based user profiles with a corresponding group-based communication interface as well as at least one aspect of the scope of activities of the group-based user profiles associated with corresponding group-based communication interface. In some embodiments, the interface configuration user interface may be an administrator panel user interface for one or more group-based communication interfaces associated with a group-based communication system.

The term "group visibility parameter" refers to a data object that defines whether group-based user profiles associated with a corresponding group-based communication interface will be able to collectively interact in a defined way with a corresponding dynamic user group. For example, a particular group visibility parameter (i.e., a group messaging permission parameter) may define whether group-based user profiles associated with a corresponding group-based communication interface will be able to collectively send a message a corresponding dynamic user group. As another example, a particular group visibility parameter (i.e., a group referential messaging parameter) may define whether group-based user profiles associated with a corresponding group-based communication interface will be able to collectively reference (e.g. @ mention) a corresponding dynamic user group. As yet another example, a particular group visibility parameter (i.e., a group integration permission parameter) may define whether group-based user profiles associated with a corresponding group-based communication interface will be able to collectively add a corresponding dynamic user group to another group-based communication interface and/or to a group-based communication channel.

The term "group membership modification request" refers to a data object that requests association of a corresponding dynamic user group and/or a cessation of an existing association of a corresponding dynamic user group with a corresponding group-based communication interface. In some embodiments, in response to a group membership modification request associated with a corresponding dynamic user group and a corresponding group-based communication interface, a group-based communication server assigns the corresponding group-based communication interface as a related group-based communication interface for the corresponding dynamic user group. In some embodiments, a group membership modification request is generated by a related administrator user profile associated with a corresponding group-based communication interface, e.g., by interacting with one or more interface configuration user interfaces.

The "external group configuration request" refers to a data object that describes a request for modification in a dynamic user group (e.g., in the group-based user profiles that are deemed to be in the dynamic user group), where the request for modification is received from a computing device and/or a software entity outside a group-based communication system within which the dynamic user group is defined. In some embodiments, an external group configuration request is provided as an application programming interface (API) call to an API configured to enable external software entities outside a group-based communication system within which the dynamic user group is defined to modify the dynamic user group. An example of an API configured to receive and process externally-issued group configuration request is Slack's SCIM API.

The term "group definition request" refers to a data object that describes one or more requested modifications in a group-based user profiles that are deemed to be in a corresponding dynamic user group. In some embodiments, a group definition request is generated by a group administrator user profile associated with a corresponding dynamic user group. In some embodiments, a group definition request is generated by a related administrator user profile associated with related group-based communication interface for a corresponding dynamic user group. In some embodiments, a group definition request is generated based on an external group configuration request. In some embodiments, a group definition request configured to define group membership data for the dynamic user group based on external identity provider group definition data.

The term "group membership data" refers to a data object that identifies one or more group-based user profiles that are deemed to be in a corresponding dynamic user grouping. In some embodiments, the group membership data may be modified in accordance with a group definition request. In some embodiments, the group membership data may be maintained in a group membership database, e.g., a relational group membership database, an object-oriented group membership database, a graph-based group membership database, etc.

The term "external identity provider group definition data" refers to a data object that identifies one or more group-based user profiles for desired inclusion in a corresponding dynamic user group, where the one or more group-based user profiles are defined by reference to identity profiles defined by one or more identity provider system (e.g., Okra, Azure, etc.). In some embodiments, an identity provider system is a system entity that creates, maintains, and/or manages identity information for users. In some embodiments, an identity provider system offers one or more user authentication services for users. Examples of identity provider systems include Security Assertion Markup Language (SAML) identity provider system and OpenID Connect (OIDC) identity provider systems. In some embodiments, external identity provider group definition data are included as part of an external group configuration request. In some embodiments, external identity provider group definition data are included as part of group membership data. In some embodiments, external identity provider group definition data are included as part of group definition requests.

The term "administrator-exclusive group-based communication channel" refers to a data object that describes a communication channel generated by a corresponding administrator user profile that exclusively includes the corresponding administrator user profile and each group-based user profile associated with a corresponding dynamic user group. In some embodiments, an administrator user profile may generate an administrator-exclusive group-based communication channel as a way of ensuring exclusive and private communications with each group-based user profile associated with a corresponding dynamic user group.

Overview

Various embodiments of the present disclosure generally relate to a method, apparatus, and system for performing dynamic user group management in a group-based communication system. However, a person of ordinary skill in the relevant technology will recognize that various techniques described herein may be used to perform dynamic user group management in any distributed largescale software application.

In largescale software applications, profile data processing incurs substantial resource costs on computer systems that execute such largescale software applications. In part due to the large number of user profiles associated with such largescale software applications, processing profile data on an individual level may incur substantial processing costs. Individual processing of profile data is especially inefficient in light of the fact that many largescale software applications store profile data as relational tables that typically include relevant profile data associated with a large number of profiles. Thus, to perform profile data processing on an individual level, various existing profile data processing applications have to retrieve relational tables containing shared profile data a large number of times (e.g., a number of times equal to the number of profiles being processed over a period). Accordingly, various existing largescale software applications face substantial efficiency challenges related to efficiently performing profile data processing.

To address the above-noted challenges associated with efficiently performing profile data processing in largescale software applications, various embodiments of the present disclosure introduce solutions for performing profile data processing on a group level. For example, some embodiments of the present disclosure introduce dynamic user groups associated with dynamic user configuration data that have dynamic bindings (e.g., bindings determined at runtime and based on a current state of the data at that point in time) with entities in a software application (e.g., with group-based communication interfaces in a group-based communication system). By utilizing the noted techniques, various embodiments of the present disclosure reduce the need to do profile data processing on an individual level along with the inefficiencies associated with such actions. In doing so, various embodiments of the present invention address the technical challenges related to efficiently performing profile data processing in largescale software applications and improve the efficiency of performing profile data processing in largescale software applications.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example architecture 100 for performing various embodiments of the present disclosure may operate. Users may access a group-based communication system 105 via a communications network (not shown) using one or more client computing devices, such as client computing devices A-C 102A-C. The group-based communication system 105 may comprise a group-based communication server 107 in communication with at least one group-based communication repository 108.

Communications network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 107 may be embodied as a computer or computers as known in the art. The group-based communication server 107 may provide for receiving of electronic data from various sources, including but not necessarily limited to the client computing devices 102A-C. For example, the group-based communication server 107 may be operable to receive and post or transmit group-based messaging communications provided by the client computing devices 102A-C.

The group-based communication repository 108 may be embodied as a data storage device such as a Network Attached Storage (NAS) device or devices, or as a separate database server or servers. The group-based communication repository 108 includes information accessed and stored by the group-based communication server 107 to facilitate the operations of the group-based communication system 105. For example, the group-based communication repository 108 may include, without limitation, a plurality of messaging communications organized among a plurality of group-based communication channels, and/or the like.

The client computing devices 102A-C may be any computing device as defined above. Electronic data received by the group-based communication server 107 from the client computing devices 102A-C may be provided in various forms and via various methods. For example, the client computing devices 102A-C may include desktop computers, laptop computers, smartphones, netbooks, tablet computers, wearables, and the like. In embodiments where a client computing device 102A-C is a mobile device, such as a smartphone or tablet, the client computing device 102A-C may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client computing device 102A-C may interact with the group-based communication system 105 via a web browser. As yet another example, the client computing device 102A-C may include various hardware or firmware designed to interface with the group-based communication system 105.

In some embodiments of an exemplary group-based communication system 105, a message or messaging communication may be sent from a client computing device 102A-C to a group-based communication system 105. In various implementations, the message may be sent to the group-based communication system 105 over communications network 104 directly by a client computing device 102A-C, the message may be sent to the group-based communication system 105 via an intermediary such as a message server, and/or the like. For example, the client computing device 102A-C may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client computing device 102A-C may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
```

```
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting disclosure. I have attached a copy our patent
policy.</contents>
        <attachments>patent_policy.pdf</attachments>
    </message>
</auth_request>
```

The group-based communication system 105 comprises at least one group-based communication server 107 that may create a storage message based upon the received message to facilitate message indexing and storage in a group-based communication repository 108. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 107 may provide the following example storage message, substantially in the form of a HTTP(S) POST message including XML-formatted data, as provided below:

```
POST /storagemessage.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
```

-continued

```
    <responses>
        <response>liked by ID_user_2</response>
        <response>starred by ID_user_3</response>
    </responses>
    <contents>That is an interesting disclosure. I have attached a copy
    our patent policy.</contents>
    <attachments>patent_policy.pdf</attachments>
    <conversation_primitive>
        conversation includes messages: ID_message_8,
        ID_message_9, ID message 10,
            ID message 11, ID_message_12
    </conversation_primitive>
</storage_message>
```

In embodiments, a group identifier as defined above may be associated with the message. In embodiments, a group-based communication channel identifier as defined above may be associated with the message. In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message. In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message. In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 108). In one implementation, a storage message may be sent from group-based communication server 107 to facilitate indexing in group-based communication repository 108. In another implementation, metadata associated with the message may be determined and the message may be indexed in group-based communication repository 108. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 108 to facilitate searching. In one embodiment, the files may be indexed such that a company's or a group's files are indexed at a separate distributed repository.

Example Apparatus for Implementing Embodiments of the Present Disclosure

The group-based communication server 107 may be embodied by one or more computing systems, such as apparatus 200 shown in FIG. 2. The apparatus 200 may include a processor 202, a memory 201, input/output circuitry 203, communications circuitry 205, and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client computing devices 102A-C to enable message sharing therebetween. The processor 202 ensures that messages intended for exchange between the client computing devices 102A-C within the particular communication channel are properly disseminated to those client computing devices 102A-C for display within respective display windows provided via the client computing devices 102A-C.

Moreover, the processor 202 may be configured to synchronize messages exchanged on a particular communication channel with a database for storage and/or indexing of messages therein. In certain embodiments, the processor 202 may provide stored and/or indexed messages for dissemination to client computing devices 102A-C.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client computing device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 108. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Client Computing Device Overview

A client computing device 102A-N may include one or more computing systems, such as the apparatus 300 shown in FIG. 3. The apparatus 300 may include a processor 302, a memory 301, input/output circuitry 303, and communications circuitry 304. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 301 may provide storage functionality, the communications circuitry 304 may provide network interface functionality, and the like.

In some embodiments, the processor 302 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 303 that may, in turn, be in communication with processor 302 to provide output to the user and, in some embodiments, to receive an indication of a user input. The input/output circuitry 303 may comprise a user interface and may include a display and may comprise a web user interface, a mobile application, a client computing device, a kiosk, or the like. In some embodiments, the input/output circuitry 303 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

The communications circuitry 304 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 304 may include, for example, a network interface for enabling communications with a wired or wireless communication network. For example, the communications circuitry 304 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Exemplary System Operations

Various embodiments of the present disclosure generally relate to a method, apparatus, and system for performing dynamic user group management in a group-based communication system. However, a person of ordinary skill in the relevant technology will recognize that various techniques described herein may be used to perform dynamic user group management in any distributed largescale software application.

FIG. 4 is a flowchart diagram of an example process 400 for performing dynamic user group management in a group-based communication system 105. Via the operations of process 400, the group-based communication server 107 can increase efficiency of a group-based communication system 105 by enabling performing computationally resource-intensive user profile management action on an aggregate, group-level.

The process 400 begins at operation 401 when the group-based communication server 107 receives dynamic user group configuration data associated with a dynamic user group, where the dynamic user group configuration data comprise interface association data associated with the dynamic user group, and where the interface association data define a related group-based communication interface of a plurality of group-based communication interfaces of the group-based communication system 105 that is associated with the dynamic user group. In some embodiments, the dynamic user group configuration data comprise one or more defined group visibility parameters for the dynamic user group with respect to the related group-based communication interface. In some embodiments, the related group-based communication interface is associated with a related administrator user profile. In some embodiments, the dynamic user group configuration data for a dynamic user group comprise group membership data for the dynamic user group.

In some embodiments, the dynamic user group configuration data are generated based on one or more external group configuration requests provided to an external group configuration application programing interface associated with the group-based communication interface. A flowchart diagram of an example process 500 for determining dynamic user group configuration data based on external group configuration requests is presented in FIG. 5. As depicted in FIG. 5, the process 500 begins at operation 501 when the group-based communication server receives the one or more external group configuration requests provided to an external group configuration application programing interface associated with the related group-based communication interface. In some of the noted embodiments, the one or more external group configuration requests comprise a group definition request configured to define group membership data for the dynamic user group based on one or more group definition requests, e.g., group definition requests determined based on external identity provider group definition data provided to an external group configuration application programing interface associated with the group-based communication system 105.

In some embodiments, the one or more external group configuration requests are generated in response to user interactions with an external group configuration interface configured to enable importing external identity provider group definition data into the group-based communication system 105. An operational example of an external group configuration interface 800 is presented in FIG. 8. As depicted in FIG. 8, the external group configuration interface 800 enables importing external identity provider group definition data defining one or more externally-defined groups, such as the externally-defined group 801 and the externally-defined group 802. As further depicted in FIG. 8, the external group configuration interface 800 enables obtaining membership metadata and interface (i.e., workspace) association metadata for each externally-defined group. For example, externally-defined group 801 is associated with membership metadata 811 and interface association metadata 821. As another example, externally-defined group 802 is associated with membership metadata 812 and interface association metadata 822.

Returning to FIG. 5, at operation 502, the group-based communication server 107 determines dynamic user group configuration data based on the external group configuration request. In some embodiments, the group-based communication server 107 determines group membership data based on the external group configuration request and determines the dynamic user group configuration data based on the group membership data.

Returning to FIG. 4, at operation 402, the group-based communication server 107 identifies a related group-based communication interface for the dynamic user group based on the dynamic user group configuration data for the dynamic user group. In some embodiments, the group-based communication server 107 determines the related group-based communication interface based on the interface association data in the dynamic user group configuration data. While various embodiments of the present disclosure are described with reference to a single related group-based communication channel, a person of ordinary skill in the art will recognize that techniques of the present disclosure enable associating dynamic user groups with more than one related group-based communication interface as well as of dynamic user group management in contexts where at least one dynamic user group is associated with more than one related group-based communication interface.

An operational example of a software architecture 900 that enables dynamically associating user groups with group-based communication interfaces is depicted in FIG. 9. As depicted in FIG. 9, identity provider data 901 supplied as part of a call to an external group configuration application programing interface 902 can lead to generating dynamic user groups 903-904. As further depicted in FIG. 9, once generated, the dynamic user groups 903-904 can be bound to group-based communication interfaces 905-907. For example, as depicted in FIG. 9, the dynamic user group 903 is bound to one group-based communication interface (i.e., has one related group-based communication interface) and the dynamic user group 904 is bound to two group-based communication interfaces (i.e., has two related group-based communication interfaces).

Returning to FIG. 4, at operation 403, the group-based communication server 107 generates one or more interface configuration user interfaces configured to enable the related administrator user profile for the related group-based communication interface to define one or more group visibility parameters for the dynamic user group with respect to the related group-based communication interface and to enable the related administrator user profile for the related group-based communication interface to generate group membership modification requests for the dynamic user group. In some embodiments, one or more interface configuration user interfaces configured to enable the related administrator user profile for the related group-based communication interface to define one or more group visibility parameters for the dynamic user group with respect to the related group-based communication interface and to enable the related administrator user profile for the related group-based communication interface to generate group membership modification requests for the dynamic user group.

In some embodiments, the interface configuration user interfaces are configured to enable the related administrator user profile for the related group-based communication interface to define one or more group visibility parameters for the dynamic user group. Once defined by the related administrator user profile for the related group-based communication interface, the defined group visibility parameters are enforced by the group-based communication server 107 within the related group-based communication interface.

A flowchart diagram of an example process 600 for enforcing group visibility parameters is depicted in FIG. 6. As depicted in FIG. 6, the process 600 begins at operation 601 receives the group visibility parameters for the dynamic user group with respect to the related group-based communication interface. In some embodiments, the group visibility parameters are generated by the related administrator user profile for the related group-based communication interface. In some embodiments, the related administrator user profile generates the group visibility parameters by interacting with a visibility-defining interface configuration user interface, such as the visibility-defining interface configuration user interface 1100 of FIG. 11 that is configured to define visibility parameters for a dynamic user group with respect to a corresponding related group-based communication channel via the user interface elements 1101-1103 that each enable configuring group referential permission parameters, group messaging permission parameters, and group integration permission parameters respectively. In some embodiments, a visibility-definition interface configuration user interface (such as the visibility-defining interface configuration user interface 1100 of FIG. 11) can be reached via a general interface configuration user interface, such as using the user interface element 1001 in the general interface configuration user interface 1000 of FIG. 10.

Examples of group visibility parameters includes group identifying permission parameters, group referential permission parameters, group messaging permission parameters, and group integration permission parameters. In some embodiments, a group identifying permission parameter indicates whether existence of a corresponding dynamic user group will be disclosed to group-based user profiles associated with a corresponding related group-based communication channel.

At operation 602, the group-based communication server 107 enforces the group visibility parameters. In some embodiments, the group-based communication server 107 enforces group visibility parameters by modifying configuration data associated with the related group-based communication channel in order to establish access control guidelines established by the group visibility parameters. In some embodiments, the group-based communication server 107 enforces group visibility parameters by communicating with an administrator API associated with the related group-based communication channel.

In some embodiments, the interface configuration user interfaces are configured to enable the related administrator user profile for the related group-based communication interface to enable the related administrator user profile for the related group-based communication interface to generate group membership modification requests for the dynamic user group. Once generated by the related administrator user profile for the related group-based communication interface, a group membership modification request is processed by the group-based communication server 107 within the related group-based communication interface.

A flowchart diagram of an example process 700 for enforcing a group membership modification request is depicted in FIG. 7. As depicted in FIG. 7, the process 700 begins at operation 701 when the group-based communication server 107 receives a group membership modification request. In some embodiments, the group membership modification request is a request by an administrator user profile associated with a group-based communication channel to bind a dynamic user group to the group-based communication channel. In some embodiments, the group membership modification request is a request by a related administrator user profile associated with a related group-based communication channel to unbind a dynamic user group from the related group-based communication channel. In some embodiments, the group modification request is generated based on one or more interactions of an administrator user profile with an interface configuration user interface.

At operation 702, the group-based communication server 107 modifies interface association data associated with the dynamic user group that is associated with the group membership modification request in accordance with the group membership modification request. In some embodiments, a dynamic user group is deemed associated with a group membership modification request if the dynamic user group seeks to change interface associations of the dynamic user group. In some embodiments, a group membership modification request is deemed associated with a group-based communication request if group membership modification request is generated by an administrator user profile of the group-based communication channel and in relation to membership of the group-based communication channel.

In some embodiments, if the group membership modification request is a request by an administrator user profile associated with a group-based communication channel to bind a dynamic user group to the group-based communication channel, the group-based communication server 107 modifies the interface association data for the dynamic user group to designate the group-based communication channel as a related group-based communication channel for the dynamic user group. In some embodiments, if the group membership modification request is a request by an administrator user profile associated with a group-based communication channel to unbind a dynamic user group from the group-based communication channel, the group-based communication server 107 modifies the interface association data for the dynamic user interface to remove the group-based communication channel as a related group-based communication channel for the dynamic user group.

Additional Example Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for performing dynamic user group management in a group-based communication system, the apparatus comprising at least one processor and at least one memory including program code, the at least one memory and the program code configured to, with the at least one processor, cause the apparatus to at least:

assign a plurality of user profiles, of the group-based communication system, to a dynamic user group, wherein the dynamic user group is configured, via one or more group parameters, for collective management of one or more functionalities made accessible to the plurality of user profiles;

create an association between the dynamic user group and a group-based communication interface of the group-based communication system, comprising one or more channels to facilitate interaction with the group-based communication system; and based at least in part on configuration data associated with the dynamic user group and the association between the dynamic user group and the group-based communication interface, generate a configuration user interface to enable an administrator user profile, associated with the group-based communication interface to collectively assign at least one of the one or more functionalities to the plurality of user profiles by at least one of defining or modifying the one or more group parameters.

2. The apparatus of claim 1, wherein the program code, the at least one memory and the program code are further configured to, with the at least one processor, cause the apparatus to at least:

receive a first group membership modification request to remove a user profile from the plurality of user profiles associated with the dynamic user group; and in response to receiving the first group membership modification request, remove the user profile from the plurality of user profiles.

3. The apparatus of claim 1, wherein the configuration data are generated based on one or more external group configuration requests provided to an external group configuration application programing interface associated with the group-based communication system.

4. The apparatus of claim 3, wherein the one or more external group configuration requests comprise a group definition request configured to define group membership data for the dynamic user group based on external identity provider group definition data.

5. The apparatus of claim 1, wherein the one or more group parameters comprise a group referential permission parameter.

6. The apparatus of claim 1, wherein the one or more group parameters comprise a group messaging permission parameter.

7. The apparatus of claim 1, wherein the one or more group parameters comprise a group integration permission parameter.

8. The apparatus of claim 1, wherein the configuration user interface is further configured to enable the administrator user profile to generate an administrator-exclusive channel associated with the dynamic user group.

9. A computer-implemented method for performing dynamic user group management in a group-based communication system, the computer-implemented method comprising:

assigning a plurality of user profiles, of the group-based communication system, to a dynamic user group, wherein the dynamic user group is configured, via one or more group parameters, for collective management of one or more functionalities made accessible to the plurality of user profiles;

creating an association between the dynamic user group and a group-based communication interface of the group-based communication system, comprising one or more channels to facilitate interaction with the group-based communication system; and based at least in part on configuration data associated with the dynamic user group and the association between the dynamic user group and the group-based communication interface, generating a configuration user interface to enable an administrator user profile, associated with the group-based communication interface to collectively assign at least one of the one or more functionalities to the plurality of user profiles by at least one of defining or modifying the one or more group parameters.

10. The computer-implemented method of claim 9, further comprising:

receiving a first group membership modification request to remove a user profile from the plurality of user profiles associated with the dynamic user group; and in response to receiving the first group membership modification request, removing the user profile from the plurality of user profiles.

11. The computer-implemented method of claim 9, wherein the configuration data are generated based on one or more external group configuration requests provided to an external group configuration application programing interface associated with the group-based communication system.

12. The computer-implemented method of claim 11, wherein the one or more external group configuration requests comprise a group definition request configured to define group membership data for the dynamic user group based on external identity provider group definition data.

13. The computer-implemented method of claim 9, wherein the one or more group parameters comprise a group referential permission parameter.

14. A non-transitory computer storage medium comprising instructions for performing dynamic user management in a group-based communication system, the instructions being configured to cause one or more processors to at least perform operations configured to:

assign a plurality of user profiles, of the group-based communication system, to a dynamic user group, wherein the dynamic user group is configured, via one or more group parameters, for collective management of one or more functionalities made accessible to the plurality of user profiles;

create an association between the dynamic user group and a group-based communication interface of the group-based communication system, comprising one or more channels to facilitate interaction with the group-based communication system; and based at least in part on configuration data associated with the dynamic user group and the association between the dynamic user group and the group-based communication interface, generate a configuration user interface to enable an administrator user profile, associated with the group-based communication interface to collectively assign at least one of the one or more functionalities to the plurality of user profiles by at least one of defining or modifying the one or more group parameters.

15. The non-transitory computer storage medium of claim 14, wherein the configuration data are generated based on one or more external group configuration requests provided to an external group configuration application programing interface associated with the group-based communication system.

16. The non-transitory computer storage medium of claim 15, wherein the one or more external group configuration requests comprise a group definition request configured to define group membership data for the dynamic user group based on external identity provider group definition data.

17. The non-transitory computer storage medium of claim 14, wherein the configuration user interface is further configured to enable the administrator user profile to generate an administrator-exclusive group-based communication channel associated with the dynamic user group.

18. The apparatus of claim 1, wherein the configuration user interface further enables the administrator user profile to collectively associate the plurality of user profiles with a channel of the one or more channels associated with the group-based communication interface, or dissociate the plurality of user profiles from the channel.

19. The apparatus of claim 1, wherein the configuration user interface further enables the administrator user profile to collectively generate requests for collectively modifying the association between the dynamic user group and the group-based communication interface.

20. The non-transitory computer storage medium of claim 14, wherein the one or more group parameters comprise at least one of a group referential permission parameter, a group messaging permission parameter, or a group referential permission parameter.

* * * * *